(12) United States Patent
Cheung et al.

(10) Patent No.: US 7,279,866 B2
(45) Date of Patent: Oct. 9, 2007

(54) CHARGER/JUMPER METHOD AND APPARATUS

(75) Inventors: Peter T. K. Cheung, Richmond (CA); Tony Ziccardi, Vancouver (CA)

(73) Assignee: Xantrex International, St. Michael (BB)

( * ) Notice: Subject to any disclaimer, the term of this patent is extended or adjusted under 35 U.S.C. 154(b) by 421 days.

(21) Appl. No.: 10/956,023

(22) Filed: Oct. 4, 2004

(65) Prior Publication Data

US 2006/0071631 A1    Apr. 6, 2006

(51) Int. Cl.
*H01M 10/46* (2006.01)

(52) U.S. Cl. .................................................. 320/105

(58) Field of Classification Search ............... 320/104, 320/105, 107, 112, 114, 115
See application file for complete search history.

(56) References Cited

U.S. PATENT DOCUMENTS 5,083,076 A * 1/1992 Scott ........................ 320/105

6,377,029 B1    4/2002 Krieger et al. ............. 320/139
2003/0011344 A1    1/2003 Bertness et al. ........... 320/103

OTHER PUBLICATIONS

"Introducing Jump'n Charge"; Vector Manufacturing, Ltd.; 2004, 1 page.

* cited by examiner

*Primary Examiner*—Edward H Tso

(57) ABSTRACT

An apparatus for jumping and charging a remote battery. The apparatus includes a charger, positive and negative charge connectors operable to be connected to the remote battery, an auxiliary battery having positive and negative terminals, and positive and negative jumper connectors separate from the positive and negative charge connectors. The positive and negative jumper connectors are connected to the positive and negative terminals of the auxiliary battery and are operable to be connected to the remote battery. The apparatus further includes a selector responsive to connecting the positive and negative charge connectors to the remote battery and operable to connect the charger to the auxiliary battery when the charge connectors are not connected to the remote battery and to connect the charger to the positive and negative charge connectors to charge the remote battery when the positive and negative charge connectors are connected to the remote battery.

19 Claims, 2 Drawing Sheets

CHARGER/JUMPER METHOD AND APPARATUS

BACKGROUND OF THE INVENTION

1. Field of Invention

This invention relates to battery chargers and battery jumpers and in particular to an apparatus for jumping and charging a remote battery.

2. Description of Related Art

Portable battery chargers are known in the art. The use of a separate battery to jump start a vehicle having a starting battery is also known. Battery chargers are typically relatively low current devices that provide a charging current to a battery over a period of time. This charging current may be varied, depending upon the state of charge of the battery being charged. The state of charge of the battery being charged may be sensed by detecting the amount of current drawn and the amount of voltage applied by the charger to the battery. Since, with most battery chargers the current supplied to the battery, that is, the charging current, is relatively low compared to normal currents drawn from the battery when powering a starting motor of a vehicle, for example, relatively light cables may be used to connect the charger to the battery to be charged. Since the charging current is relatively low, the cables used to connect the charger to the battery may be made of relatively light gauge wire and the length of the cables may be relatively long as the voltage drop that occurs in the cables is relatively low. The use of long light cables permits the battery charger to be placed on a table or on the ground beside a vehicle in which the battery to be charged is located. Since typical battery cables are made of relatively light gauge wire, they are easy to manipulate and work with around a vehicle.

The use of a separate battery to jump start a vehicle having a starting battery requires the ability to conduct significant currents, often in excess of 100A, in the case of an automobile starting battery and generally this requires relatively short, relatively heavy gauge cables for connecting the separate or auxiliary battery to the starting battery. After the separate battery is used to jump start a vehicle, for example, the separate battery is depleted from its original charge state and must be re-charged. This is often done with a separate charger, which may be of the type described above.

Prior inventors have integrated a portable battery charger with a booster battery, such as disclosed in U.S. patent application Ser. No. 10/177,635 published under US Pub. No.: U.S. 2003/0011344 A1 on Jan. 16, 2004, to produce an integrated battery charger with booster pack. However, such a system employs the same wires for charging and jumping, which inherently requires relatively heavy gauge cables to be used to connect the device to a remote battery for charging or jumping, which can be disadvantageous, for the reasons presented above.

SUMMARY OF THE INVENTION

In accordance with one aspect of the invention, there is provided an apparatus for jumping and charging a remote battery. The apparatus includes a charger, positive and negative charge connectors operable to be connected to the remote battery, an auxiliary battery having positive and negative terminals and positive and negative jumper connectors separate from the positive and negative charge connectors. The positive and negative jumper connectors are connected to the positive and negative terminals of the auxiliary battery and are operable to be connected to the remote battery. The apparatus further includes a selector responsive to connecting the positive and negative charge connectors to the remote battery and operable to connect the charger to the auxiliary battery when the charge connectors are not connected to the remote battery and to connect the charger to the positive and negative charge connectors to charge the remote battery when the positive and negative charge connectors are connected to the remote battery.

The selector may include a relay operable to selectively connect the charger to the auxiliary battery and to the positive and negative charge connectors and may include a switching circuit for energizing and unenergizing the relay in response to connecting the positive and negative charge connectors to the remote battery.

The switching circuit may include a sensor for sensing whether or not the positive and negative charge connectors are connected to the remote battery.

The sensor may include an opto-isolator and a first switch, the opto-isolator having a light emitting diode connected to the positive and negative charge connectors such that the light emitting diode is energized by the remote battery, and the sensor may include a light sensitive switch responsive to light from the light emitting diode to actuate the first switch, the first switch being connected to the relay to energize the relay when the first switch is actuated.

The apparatus may further include a delay circuit connected to the first switch to delay energization of the relay until after an initial connection transient occurs upon connection of the positive and negative charge connectors to the remote battery.

The apparatus may further include a first set of conductors connecting the positive and negative charge connectors to the selector and the charger and a second set of conductors connecting the positive and negative jumper connectors to the positive and negative terminals of the auxiliary battery, the second set of conductors including wire having a gauge heavier than a gauge of the first set of conductors.

The charger, the auxiliary battery and the selector may be housed within a common housing.

The positive and negative jumper connectors may be connected to the positive and negative terminals of the auxiliary battery by a first set of wires. At least one of the positive and negative charge connectors may be connected to the selector by a wire, separate from the first set of wires.

The first set of wires and the wire may extend outside of the housing.

In accordance with another aspect of the invention, there is provided an apparatus for jumping and charging a remote battery. The apparatus includes charging provisions for charging the remote battery and positive and negative charge connectors operable to be connected to the remote battery. The apparatus further includes an auxiliary battery having positive and negative terminals and positive and negative jumper connectors separate from the positive and negative charge connectors. The positive and negative jumper connectors may be connected to the positive and negative terminals of the auxiliary battery and may be operable to be connected to the remote battery. The apparatus further includes selector provisions responsive to connecting the positive and negative charge connectors to the remote battery for selectively connecting the charging provisions to the auxiliary battery when the charge connectors are not connected to the remote battery and to selectively connect the charging provisions to the positive and negative charge connectors to charge the remote battery when the positive and negative charge connectors are connected to the remote battery.

The selector provisions may include detecting provisions for detecting when the positive and negative charge connectors are connected to the remote battery.

The detecting provisions may include an opto-isolator and switching provisions controlled by the opto-isolator. The opto-isolator may have a light emitting diode connected to the positive and negative charge connectors such that the light emitting diode may be energized by the remote battery when the positive and negative charge connectors are connected to the remote battery. The opto-isolator may further include a light sensitive switch responsive to light from the light emitting diode, the light sensitive switch being connected to the switching provisions to actuate the switching provisions to connect the charging provisions to the remote battery when the light emitting diode emits light.

The apparatus may further include delay provisions for delaying connection of the charging provisions to the positive and negative charge connectors until after the positive and negative charge connectors are fully connected to the remote battery.

The apparatus may further include first conducting provisions for connecting at least one of the positive and negative charge connectors to the selector and second conducting provisions for connecting the positive and negative jumper connectors to the positive and negative terminals of the auxiliary battery, the second conducting provisions being capable of conducting more current than the first conducting provisions.

In accordance with another aspect of the invention, there is provided a method of operating an apparatus for selectively jumping and charging a remote battery. The method may involve detecting connection of charging connectors to the remote battery, selectively connecting a battery charger to the remote battery in response to detecting connection of the charging connectors to the remote battery, and selectively connecting the battery charger to an auxiliary battery when connection of the charging connectors to the remote battery is not detected.

The method may further involve delaying the connection of the battery charger to the remote battery until a period after the connection of the charging connectors to the remote battery is detected.

The method may involve delaying the connection of the battery charger to the remote battery sufficiently to avoid sparking between the battery and the charging connectors.

The method may further involve actuating a switch when the charging connectors may be connected to the battery to energize a relay operable to selectively connect the battery charger to the remote battery.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
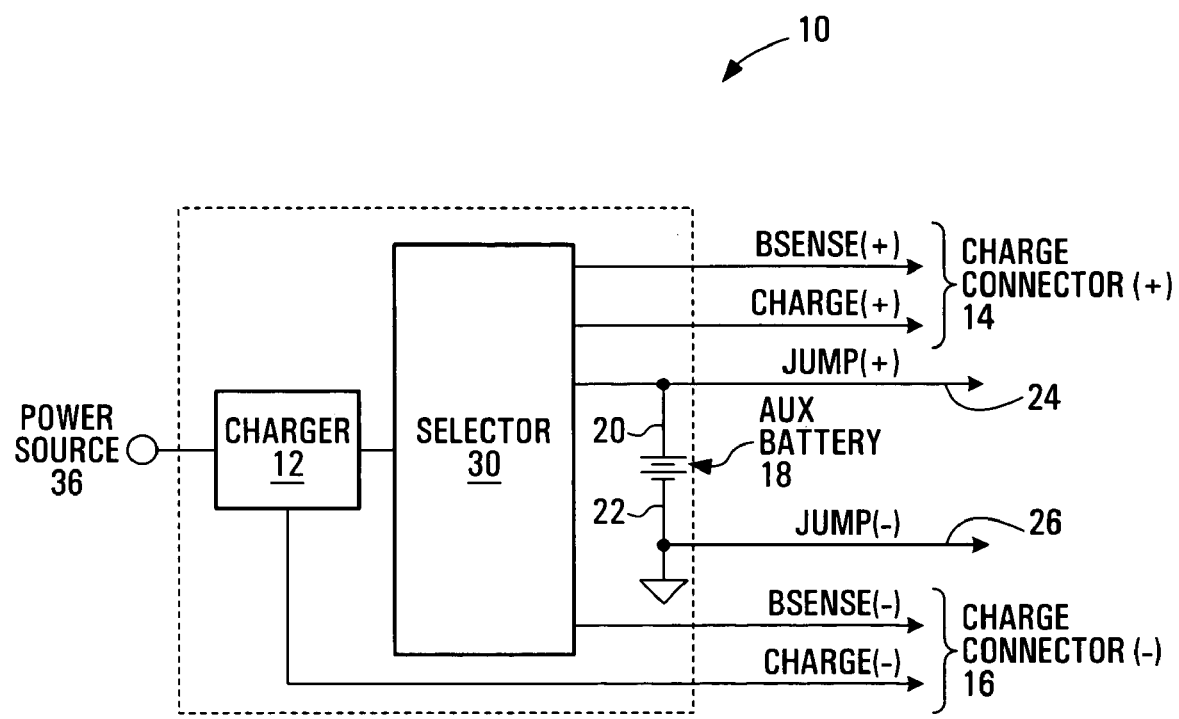
FIG. 1 is a block diagram of an apparatus according to a first embodiment of the invention.

Referring to FIG. 1, an apparatus for jumping and charging a remote battery 8 is shown generally at 10. The apparatus includes a battery charger 12 and positive and negative charge connectors 14 and 16 operable to be connected to the remote battery 8. The apparatus 10 further includes an auxiliary battery 18 having positive and negative terminals 20 and 22, respectively. The auxiliary battery may be a 12 AH or 20 AH gel cel, for example. Positive and negative jumper connectors 24 and 26, separate from the positive and negative charge connectors 14 and 16, are connected by heavy gauge wires to the positive and negative terminals 20 and 22 of the auxiliary battery 18 and are operable to be connected to the remote battery 8. The apparatus 10 further includes a selector 30 responsive to connecting the positive and negative charge connectors 14 and 16 to the remote battery 8 and operable to connect the charger 12 to the auxiliary battery 18 when the charge connectors are not connected to the remote battery and operable to connect the charger to the positive and negative charge connectors 14 and 16 to recharge the remote battery when the positive and negative charge connectors are connected to the remote battery.

Figure 2:
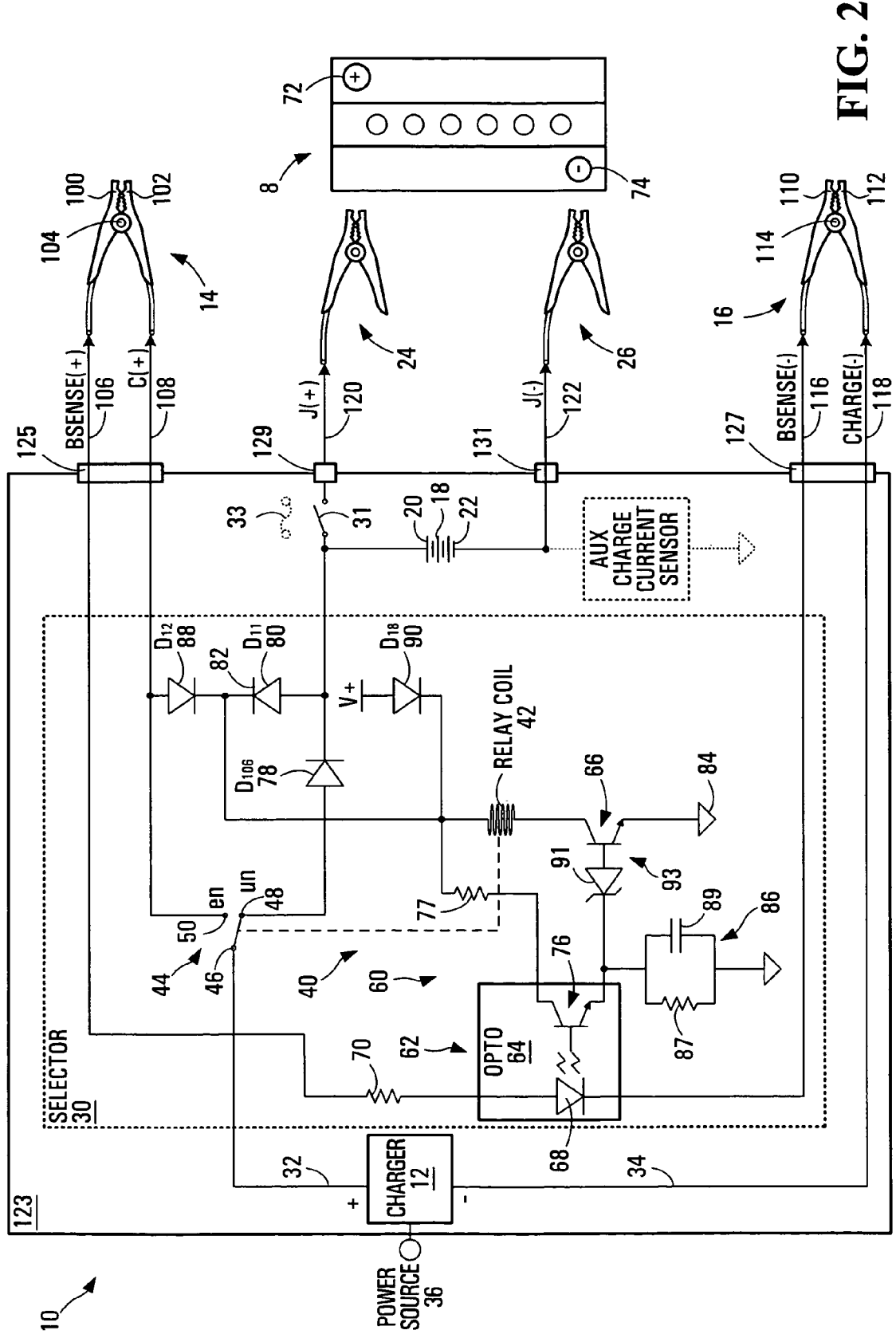
FIG. 2 is a schematic diagram of the apparatus shown in FIG. 1.

Referring to FIG. 2, the above components of the apparatus 10 are shown in greater detail. In the embodiment shown, the charger 12 may include a conventional battery charger having positive and negative outputs 32 and 34, respectively. The battery charger 12 may be rated for 15 A or 40 A, for example, although a battery charger of any current rating could be used. The charger 12 is shown as receiving power from a power source shown generally at 36. It will be appreciated that the power source 36 may include a variety of different energy sources including such things as solar panels, batteries, wind generators, AC mains supply or virtually any other electrical power source. Typically, the charger 12 will include voltage and current regulation circuits and these may include over voltage or under voltage sensor and over current or under current sensors (not shown), for controlling voltage and current at the positive and negative outputs 32 and 34.

In this embodiment, the selector 30 includes a relay depicted generally at 40 including a relay coil 42 and contacts shown generally at 44. The contacts 44 include a common contact 46 to which the positive output 32 of the charger 12 is connected. The contacts 44 further include an unenergized contact 48 and an energized contact 50, which are selectively connected to the common contact 46 by a wiper 52 operable to be moved by the relay coil 42 when the relay 40 is energized and unenergized, respectively. When the relay coil 42 is unenergized, the wiper 52 connects the common contact 46 to the unenergized contact 48 and when the relay coil 42 is energized, the wiper is moved to a position in which the common contact 46 is connected to the energized contact 50.

The selector 30 further includes a switching circuit shown generally at 60 for energizing and unenergizing the relay coil 42. The switching circuit 60 includes a sensor 62 for sensing or detecting whether or not the positive and negative charge connectors 14 and 16 are connected to the remote battery 8.

In the embodiment shown, the sensor 62 includes an opto-isolator 64 and a switch shown generally at 66. The opto-isolator 64 includes a light emitting diode 68 and a resistor 70 connected in series between the positive charge connector 14 and the negative charge connector 16. Thus, when the positive charge connector 14 is connected to a positive terminal 72 of the remote battery 8 and the negative charge connector 16 is connected to a negative terminal 74 of the remote battery, the remote battery supplies a small amount of current which is drawn through the resistor 70 to energize the light emitting diode 68. Light produced by the light emitting diode 68 is received by a light sensitive switch 76, which in this embodiment includes a transistor of the opto-isolator 64. The light sensitive switch 76 is responsive to light from the light emitting diode to actuate the switch 66 to energize the relay coil 42.

When the positive and negative charge connectors 14 and 16 are not connected to the positive and negative terminals 72 and 74 of the remote battery 8, the relay coil 42 is unenergized, in which case the common contact 46 is connected to the unenergized contact 48 of the relay 40. The unenergized contact 48 is connected to a first diode 78 connected to the positive terminal 20 of the auxiliary battery 18 and connected to the positive jumper connector 24. In addition, the first diode 78 is connected to a second diode 80 having a cathode 82 connected to the relay coil 42. Thus, charge current from the charger 12 is supplied to the auxiliary battery 18, when the positive and negative charge connectors 14 and 16 are not connected to the remote battery 8. In this mode, charge current from the charger 12 is applied to the auxiliary battery 18 to charge the auxiliary battery.

When the positive and negative charge connectors 14 and 16 are connected to the positive and negative terminals 72 and 74 of the remote battery 8, current flows from the remote battery 8 through the resistor 70 and through the light emitting diode 68 causing the light sensitive switch 76 to turn on and conduct current through a first resistor 77, with sufficient magnitude to turn on the switch 66 to connect the relay coil 42 to a signal common terminal 84 to thereby energize the relay coil 42. A delay circuit shown generally at 86 comprised of the first resistor 77 and a second resistor 87 and a capacitor 89 in parallel with a Zener diode 91 and base emitter circuit 93 of the switch 66 delays actuation of the switch 66 to provide a "soft start" feature, which prevents large current transients from being drawn from the remote battery to energize the relay coil 42 until after the positive and negative charge connectors 14 and 16 are fully connected to the remote battery 8. The delay circuit causes charge to build on the capacitor 89 until the voltage at the capacitor exceeds a breakdown voltage of the Zener diode 91, at which time sufficient current flows in the base-emitter circuit 93 to cause the switch 66 to turn on. Thus, the switch 66 is switched on a period of time after the positive and negative charge connectors 14 and 16 are connected to the positive and negative battery terminals 72 and 74. The delay may be about one second, for example. The delay provided by the delay circuit 86 prevents excessive sparking from occurring when the positive and negative charge connectors 14 and 16 are connected to the positive and negative terminals 72 and 74 of the remote battery. Such sparking is common in prior art devices. Effectively, the delay circuit 86 acts to delay connection of the charger 12 to the positive and negative charge connectors 14 and 16 until after the positive and negative charge connectors 14 and 16 are fully connected to the positive and negative terminals 72 and 74 of the remote battery 8.

The relay coil 42 is further connected to the positive charge connector 14 by a third diode 88 and is further connected to a power supply (not shown) by a fourth diode 90. The power supply may be an auxiliary circuit of the charger 12 or may be a separate power supply derived from the power source 36, for example. In effect, the arrangement of diodes shown permits the relay coil 42 to be energized by any of the charger 12, the auxiliary power supply, the remote battery 8 and the auxiliary battery 18.

The positive and negative charge connectors 14 and 16 may include clamp type connectors. For example, the positive charge connector 14 may include a relatively light duty clamp type connector having first and second spring-biased jaws 100 and 102 connected by a conductive pin 104 and connected to a relatively light gauge (10-14 AWG) positive battery sensing conductor 106 and a relatively light gauge (10-14 AWG) positive charge conductor 108, respectively. The battery sensing conductor 106 connects the first jaw 100 of the positive charge connector 14 to the resistor 70. The positive charge conductor 108 connects the second jaw 102 to the energized contact 50 of the relay 40.

Similarly, the negative charge connector 16 may include a clamp-type connector having first and second spring-biased jaws 110 and 112, respectively, connected together by a conductive pin 114. The first jaw 110 is connected to a relatively light gauge (10-14 AWG) negative battery sensing conductor 116 and the second jaw 112 is connected to a relatively light gauge (10-14 AWG) negative charge conductor 118. The negative battery sensing conductor 116 connects the first jaw 110 to the light emitting diode 68 to conduct current from the light emitting diode 68 back to the negative terminal 74 of the remote battery 8. The negative charge conductor 118 connects the negative output 34 of the charger 12 to the second jaw 112 of the negative charge connector 16.

While the battery sensing conductors 106 and 116 and the positive and negative charge conductors 108 and 118 are connected to the first and second jaws, respectively, of their respective charge connectors 14 and 16, in some embodiments, the positive battery sensing conductor 106 and positive charge conductor 108 may be connected together and the negative battery sensing conductor 116 and the negative charge conductor 118 may be connected together or may be provided by common conductors. However, by separating the positive and negative battery sensing conductors 106 and 108 from the positive and negative charge conductors 116 and 118 and connecting them only at a single point near the positive and negative charge connectors 14 and 16, such as at the conductive pins 104 and 114, respectively, the battery sensing conductors 106 and 116 may be connected to current or voltage sensing circuits (not shown) for sensing current and voltage relative to the pins 104 and 114, without such measurements being noticeably disturbed by charge current supplied to the remote battery 8 through the positive and negative charge conductors 108 and 118, respectively.

While the selector 30 is shown as switching the charger current to and from the positive charge conductor 108, it will be appreciated that with suitable modifications the selector 30 may be adapted to switch the charger current to and from the negative charge conductor 118 or may be adapted to providing switching to both the positive and negative charge conductors 108 and 118. In general, at least one of the positive and negative charge connectors 14 and 16 may be connected to the selector 30 by at least one wire separate from wires used to connect the positive and negative jumper connectors 24 and 26 to the positive and negative terminals 20 and 22 of the auxiliary battery 18.

The positive and negative jumper connectors 24 and 26 may also be formed of spring-biased jaw type clamp connectors, but these should be relatively heavy duty connectors capable of carrying several hundred amperes of current and these may be connected by a set of relatively heavy gauge wire cables such as 6 or 8 AWG battery cables 120 and 122, respectively, to the positive and negative terminals 20 and 22 of the auxiliary battery 18. It will be appreciated that the heavy gauge cables 120 and 122 are operable to conduct relatively high currents from the auxiliary battery 18 to the positive and negative terminals 72 and 74 of the remote battery 8 to permit current to be supplied by both the remote battery 8 and the auxiliary battery 18 to a load such as a vehicle starting motor normally powered by the remote battery 8.

In the embodiment shown, the cable 120 connecting the positive jumper connector 24 to the auxiliary battery 18 is desirably connected through a switch 31, where a 12 AH battery is used as the auxiliary battery 18 or through a 250 A fuse 33, where a 20 AH battery is used as the auxiliary battery. Desirably, at least one of the cables 120 and 122 is either fused or switched to provide some protection to the auxiliary battery in the event the positive and negative jumper connectors 24 and 26 are shorted together.

The charger 12, auxiliary battery 18 and the selector 30 are desirably housed within a common housing 123 to render the apparatus easily portable. The conductors 106, 108, 116 and 118 extend outside the housing 123 and may be removably connected to the housing 123 and charger 12 and selector 30 therein by connectors 125, 127. The cables 120 and 122 may also extend outside the housing and may be removably connected to the housing 123 and the auxiliary battery 18 therein by separate connectors 129 and 131, for convenience.

When using the jumper connectors 24 and 26, the positive and negative charge connectors 14 and 16 must first be removed from the positive and negative terminals 72 and 74, respectively, to allow the positive and negative jumper connectors 24 and 26 to make a good, solid, high current connection to the positive and negative terminals 72 and 74, respectively. By employing a set of jumper connectors 24 and 26, separate from the positive and negative charge connectors 14 and 16, the relatively heavy gauge cables 120 and 122 and heavy, duty jumper connectors 24 and 26 associated with the jumper function need only be readied for use when the jumper function is really required and normal, more frequent, use of the charger function is employed by using the relatively light duty positive and negative charge connectors 14 and 16. The relatively light gauge conductors used for the battery sensing conductors 106 and 116 and for the charge conductors 108 and 118 are easier and more convenient to handle for the relatively frequent use of the charging function than would be the case if the charger and jumper functions were provided by the same set of cables. Thus, the above apparatus provides a convenient way of facilitating frequent use of the charge function of the device and requires the use of the more cumbersome heavy gauge cables 120 and 122 and jumper connectors 24 and 26 only when the less frequently employed jumping function is required. This facilitates a great convenience to the user of the device.

While specific embodiments of the invention have been described and illustrated, such embodiments should be considered illustrative of the invention only and not as limiting the invention as construed in accordance with the accompanying claims.

What is claimed is:

1. An apparatus for jumping and charging a remote battery, the apparatus comprising:
    a charger;
    positive and negative charge connectors operable to be connected to the remote battery;
    an auxiliary battery having positive and negative terminals;
    positive and negative jumper connectors separate from said positive and negative charge connectors, said positive and negative jumper connectors being connected to said positive and negative terminals of said auxiliary battery and being operable to be connected to the remote battery; and
    a selector responsive to connecting said positive and negative charge connectors to the remote battery and operable to connect said charger to said auxiliary battery when said charge connectors are not connected to the remote battery and to connect said charger to said positive and negative charge connectors to charge said remote battery when said positive and negative charge connectors are connected to the remote battery.

2. The apparatus of claim 1 wherein said selector includes a relay operable to selectively connect said charger to said auxiliary battery and to said positive and negative charge connectors, and a switching circuit for energizing and unenergizing said relay in response to connecting said positive and negative charge connectors to the remote battery.

3. The apparatus of claim 2 wherein said switching circuit includes a sensor for sensing whether or not said positive and negative charge connectors are connected to said remote battery.

4. The apparatus of claim 3 wherein said sensor includes an opto-isolator and a first switch, said opto-isolator having a light emitting diode connected to said positive and negative charge connectors such that said light emitting diode is energized by said remote battery, and a light sensitive switch responsive to light from the light emitting diode to actuate said first switch, said switch being connected to said relay to energize said relay when said first switch is actuated.

5. The apparatus of claim 4 further comprising a delay circuit connected to said switch to delay energization of said relay until after an initial connection transient occurs upon connection of said charge connector to said remote battery.

6. The apparatus of claim 1 further comprising a first set of conductors connecting said positive and negative charge connectors to said selector and said charger and a second set of conductors connecting said positive and negative jumper connectors to said positive and negative terminals of said auxiliary battery, said second set of conductors including wire having a gauge heavier than a gauge of said first set of conductors.

7. The apparatus of claim 1 wherein said charger, said auxiliary battery and said selector are housed within a common housing.

8. The apparatus of claim 7 wherein said positive and negative jumper connectors are connected to said positive and negative terminals of said auxiliary battery by a first set of wires.

9. The apparatus of claim 8 wherein at least one of said positive and negative charge connectors is connected to said selector by a wire, separate from said first set of wires.

10. The apparatus of claim 9 wherein said first set of wires and said wire extend outside of said housing.

11. An apparatus for jumping and charging a remote battery, the apparatus comprising:
    charging means for charging the remote battery;
    positive and negative charge connectors operable to be connected to the remote battery;
    an auxiliary battery having positive and negative terminals;
    positive and negative jumper connectors separate from said positive and negative charge connectors, said positive and negative jumper connectors being connected to said positive and negative terminals of said auxiliary battery and being operable to be connected to the remote battery; and selector means, responsive to connecting said positive and negative charge connectors to the remote battery, for selectively connecting said charging means to said auxiliary battery when said charge connectors are not connected to the remote battery and to selectively connect said charging means to said positive and negative charge connectors to charge the remote battery when said positive and negative charge connectors are connected to the remote battery.

12. The apparatus of claim 11 wherein said selector means includes detecting means for detecting when said positive and negative charge connectors are connected to the remote battery.

13. The apparatus of claim 12 wherein said detecting means includes an opto-isolator and switching means controlled by said opto-isolator, said opto-isolator having a light emitting diode connected to said positive and negative charge connectors such that said light emitting diode is energized by said remote battery when said positive and negative charge connectors are connected to said remote battery, and wherein said opto-isolator includes a light sensitive switch responsive to light from said light emitting diode, said light sensitive switch being connected to said switching means to actuate said switching means to connect said charging means to the remote battery when said light emitting diode emits light.

14. The apparatus of claim 13 further comprising delay means for delaying connection of said charging means to said positive and negative charge connectors until after said positive and negative charge connectors are fully connected to the remote battery.

15. The apparatus of claim 11 further comprising first conducting means for connecting at least one of said positive and negative charge connectors to said selector and second conducting means for connecting said positive and negative jumper connectors to said positive and negative terminals of said auxiliary battery, said second conducting means being capable of conducting more current than said first conducting means.

16. A method of operating an apparatus for selectively jumping and charging a remote battery, the method comprising:

detecting connection of charge connectors to the remote battery;

selectively connecting a battery charger to the remote battery in response to detecting connection of said charging connectors to the remote battery; and selectively connecting said battery charger to an auxiliary battery when connection of said charging connectors to the remote battery is not detected.

17. The method of claim 16 further comprising delaying the connection of the battery charger to the remote battery until a period after the connection of charging connectors to the remote battery is detected.

18. The method of claim 17 wherein delaying comprises delaying said connection of the battery charger to the remote battery sufficiently to avoid sparking between said battery and said charging connectors.

19. The method of claim 16 wherein detecting comprises actuating a switch when said charging connectors are connected to said battery to energize a relay operable to selectively connect said battery charger to the remote battery.

* * * * *